May 5, 1959     G. L. CUNNINGHAM     2,885,265
PROCESS FOR PRODUCING SUBSTANTIALLY PURE ORTHOPHOSPHORIC ACID
Filed June 21, 1955
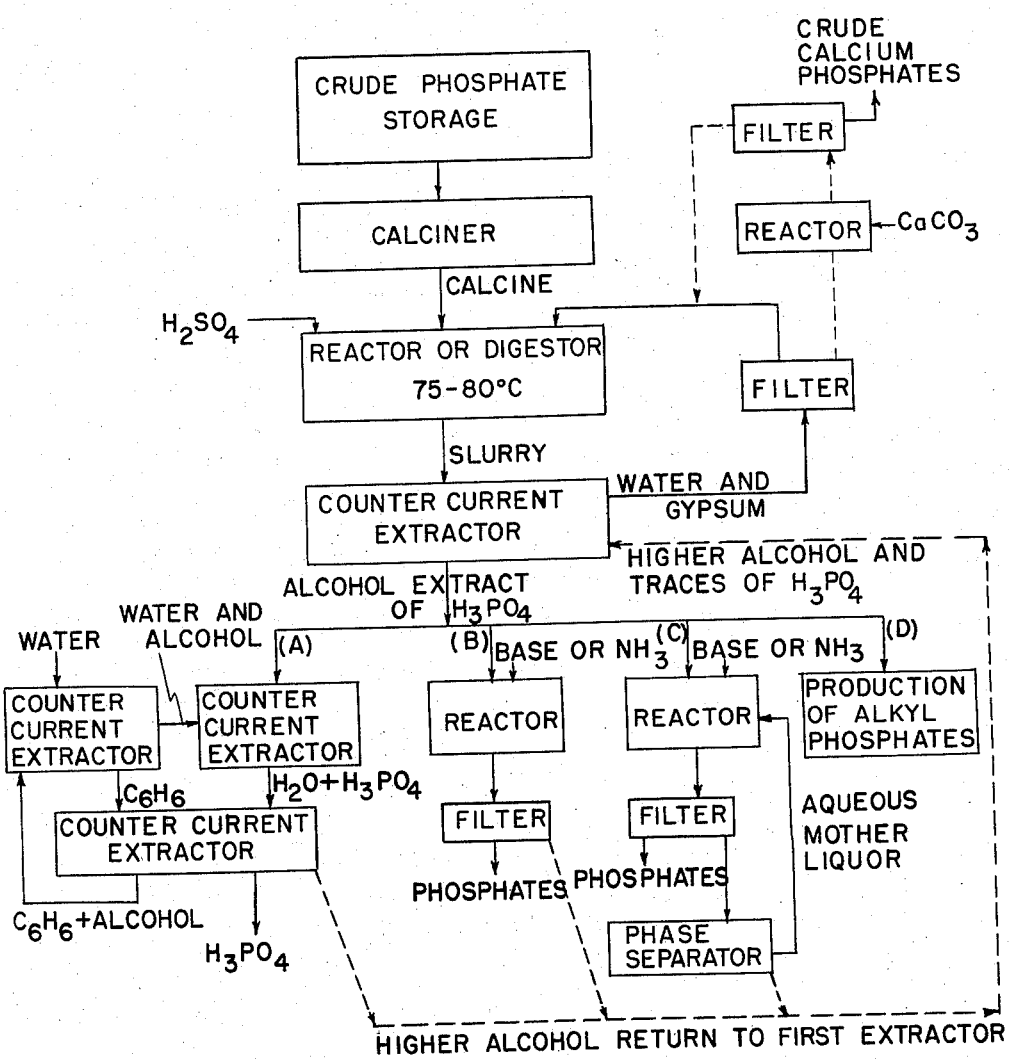
INVENTOR.
GEORGE L. CUNNINGHAM
BY Lawrence I. Field
ATTORNEY

2,885,265

PROCESS FOR PRODUCING SUBSTANTIALLY PURE ORTHOPHOSPHORIC ACID

George L. Cunningham, Cleveland Heights, Ohio, assignor to Horizons Incorporated Application June 21, 1955, Serial No. 516,865

4 Claims. (Cl. 23—165)

This invention relates to a process for the production of orthophosphoric acid and various derivatives and salts of this acid. More particularly, it relates to a process in which a crude phosphorus containing material is treated with sulfuric acid and the resulting liquid is extracted in counter-current fashion with a suitable reagent in which the phosphoric acid produced by the action of the sulfuric acid on the crude phosphorus containing material is separated from the other reaction constituents.

Two main types of processes are presently employed for the preparation of phosphoric acid and its compounds. These may be broadly grouped either as electric furnace methods or as wet processes involving the use of sulfuric acid. Electric furnace methods require the use of relatively expensive capital equipment and relatively large amounts of electrical energy for the production of phosphorus and phosphates. In the sulfuric acid process, crude phosphoric material such as naturally occurring phosphate rock is ground and calcined and then treated with sulfuric acid to form calcium sulfate and phosphoric acid. The temperature of the digestor in which the sulfuric acid treatment is effected must be kept low enough to insure precipitation of gypsum, $CaSO_4 \cdot 2H_2O$, and not anhydrite. The slurry so obtained must be filtered to remove the gypsum and this step is accomplished by thickening the slurry, and then filtering. The process requires careful control of temperatures, a very difficult filtering operation, and produces a product from which many of the impurities have not been removed.

The impurities normally found in crude phosphate materials include silica, aluminum, vanadium, fluorine, arsenic, lead and other metallic impurities. If the phosphoric acid is to be used for the production of pure chemicals or for the treatment of food for human consumption, such impurities must be more or less completely removed. The required purification is often extremely difficult to accomplish and the product obtained from either of the prior art type processes even after extensive purification often will not meet the specifications for such chemicals for food and pharmaceutical use.

In one type of the wet process, the green phosphoric acid produced by treatment with sulfuric acid is separated from the gypsum by filtration and finely divided calcium carbonate is added to the filtrate to cause precipitation of aluminum, iron, fluorine and some silica. The precipitate which tends to be gelatinous consists principally of aluminum phosphates, iron phosphates, calcium fluoride, and calcium fluosilicates. The precipitates usually occlude a substantial amount of phosphoric acid and the recovery of this by washing dilutes the product and increases the expense incident to the evaporation necessary to concentrate the phosphoric acid.

In another type of wet process, exemplified in United States Letters Patent Numbers 1,929,441 and 1,929,442 a wet process is described in which suitable phosphate containing starting material such as bone matter, deposits containing recent or fossil bone matter, mineral deposits such as apatite, or rock phosphate, is treated with a sufficient amount of sulfuric acid to convert at least the major part of the phosphate present to orthophosphoric acid. Instead of extracting the resulting mixture with water, these patents describe the separation and recovery of the phosphatic values by extracting the resulting mixture, after a period of time to permit the acid to react completely, with a suitable organic liquid which is water immiscible and which is a solvent for orthophosphoric acid. Patent 1,929,441 discloses the use of primary, secondary or tertiary alcohols having not less than three (3) and having not more than eight (8) carbon atoms in the chain carrying the hydroxyl group and Patent 1,929,442 specifies one or more of the oxygenated hydrocarbons of relatively low molecular weights such as the ketones, acids, aldehydes, ethers, as well as aliphatic and aromatic alcohols which are liquid at temperatures below about 50° C. In both patents, the organic extraction agent is brought into contact with a batch of mixed solid and liquid materials produced by reacting the phosphatic starting material with sulfuric acid.

My invention constitutes an improvement over the batch processes described in the above noted U.S. patents and is characterized by freedom from many of the operational difficulties which have interfered with the widespread exploitation and development of the patented processes. Furthermore by operating in the manner to be described, greater flexibility is achieved and it becomes possible to recover as one product food grade phosphoric acid of about 70–75% $H_3PO_4$ content, or any other strength acid, merely by varying the operation in a simple manner.

Briefly, my process operates as follows: suitable starting material such as bone matter, deposits containing recent or fossil bone matter, mineral deposits containing phosphates such as apatite, rock phosphate or any other calcareous phosphate material, is ground and calcined in a manner well known in the prior art. The calcine is then treated with sulfuric acid of a suitable strength at a temperature of about 75°–80° C. to produce calcium sulfate and green phosphoric acid. The amounts of crude phosphatic material and sulfuric acid are chosen to produce a liquid in which the orthophosphoric acid content of the liquid does not exceed about 40% by weight. The mixture of sulfuric acid and phosphate raw material is preferably stored in a suitable vessel for some hours to permit the reaction between the acid and the phosphate to proceed substantially to completion. By suitably proportioning the ingredients and controlling the temperature, the calcium sulfate produced and some of the undesirable gangue form a relatively thin slurry in the resultant liquid. Except for the preparatory calcining step, the foregoing procedure is described generally in the U.S. patents, above noted.

Instead of extracting the resultant product with a limited amount of organic material in batchwise fashion as described in the prior art, I have found that the phosphoric acid may be much more readily recovered by treating the slurry in a countercurrent fashion with a suitable nonaqueous solvent for the orthophosphoric acid whereby the phosphoric acid is separated from the mixture. The resulting thin aqueous slurry of gypsum $CaSO_4 \cdot 2H_2O$, from which the major part of the phosphoric acid has been removed is easily filtered and the filtrate is retained for use in the next cycle. Many, if not all, of the above identified impurities in the original phosphate raw material are insoluble in the non-aqueous solvent chosen and accordingly, the product extracted is a relatively pure phosphoric acid.

The phosphoric acid containing extraction liquid is stripped of its phosphoric acid content by a second counter-current process employing water or some other stripping agent. By varying the amount of stripping agent, e.g. water, the product obtained may be an aqueous solution containing between about 70% and 72% by weight of pure, food grade phosphoric acid. If it is desired to produce a derivative of phosphoric acid instead of the acid itself, a suitable oxide, hydroxide or even ammonia may be added to the non-aqueous liquid containing the extracted orthophosphoric acid for direct conversion to a product which is relatively insoluble in the extraction liquor.

A preferred method of operation in accordance with my invention is shown schematically in the attached drawing which represents a diagrammatic flow sheet of an overall process for producing phosphoric acid and derivatives of same.

As shown in the figure, raw phosphate material is first ground and then calcined. The calcine is stored in suitable hoppers or it may be fed directly into a reactor-digestor similar to those commonly employed in the conventional sulfuric acid type process. Sulfuric acid of between 20% and 95% acid content and preferably between 30% and 75% strength is gradually added to the charge in the digester. The reaction mixture is proportioned so that the amount of acid provided is sufficient to convert practically all of the crude phosphate material into orthophosphoric acid. While it is possible to deviate from this amount, it will be generally found to be most efficient to employ approximately stoichiometric proportions. The reaction mass is stored or denned for a sufficient time to complete the reaction, usually about several hours.

The resultant slurry in which calcium sulfate is present as a finely divided precipitate of gypsum ($CaSO_4 \cdot 2H_2O$) is then transferred to an extraction apparatus in which it is contacted in a counter-current fashion by a liquid in which the phosphoric acid but not the impurities accompanying the acid dissolves. The principle employed is the well-known partition principle and is based on the distribution of phosphoric acid between an aqueous phase and a non-aqueous phase. Preferably the non-aqueous phase is comprised of at least one oxygenated hydrocarbon, of relatively low molecular weight, which is a liquid at temperatures up to at least about 50° C. Various organic materials which have been found suitable include ketones, aldehydes, ethers, acids, and both aromatic and aliphatic alcohols. Where alcohols are used they should contain not less than 3 nor more than 8 carbon atoms in the chain containing the hydroxyl group. Where lower alcohols are used, it has been found that it is virtually impossible to extract the phosphoric acid from an aqueous phase because only one phase containing phosphoric acid, water and alcohol is formed. However, a relatively small amount of a lower alcohol, that is an alcohol containing fewer than 3 carbon atoms in the molecule, may be used in the organic extraction liquid provided that the amount employed is sufficiently small that two liquid layers are obtained. For example, in the following extraction employing n-butyl alcohol, a mixture of the alcohol with methanol may be used if the proportion of methanol is relatively small. If relatively large proportions of methanol are used, only one liquid phase forms in the solubility system and, as a result, it is impossible to carry out the desired counter-current extraction which constitutes my invention.

The extraction of phosphoric acid from aqueous solutions by contacting the phosphoric acid mixture with organic reagents has been described in the prior art. The method involves contacting a relatively concentrated phosphoric acid solution with the organic extracting material in a series of batch operations. From a study of the solubility systems, it will be seen that in order to effectively remove the major portion of the phosphoric acid, inordinately large amounts of organic reagent must be employed. I have found it essential that the extraction I propose be carried out in counter-current fashion whereby the material containing the lowest concentration of phosphoric acid is subjected to the relatively pure organic extracting agent and thus, complete recoveries are possible with considerably smaller amounts of organic extracting liquid.

For the system water-phosphoric acid-normal-butyl alcohol, at room temperature (25° C.) the relative solubilities are shown below:

| Grams phosphoric acid in aqueous layer (Gms./100 gms.) | Grams phosphoric acid in n-butyl alcohol layer (Gms./100 gms.) |
|---|---|
| 31 | 13.6 |
| 20 | 5.7 |
| 15 | 3.5 |
| 10 | 2.1 |
| 5 | 0.9 |

Thus, when an aqueous phosphoric acid slurry such as results from digestion of crude phosphate material with sulfuric acid is contacted with fresh n-butyl alcohol, a substantial fraction of the orthophosphoric acid will be taken up from the aqueous slurry by the alcohol layer.

With other higher alcohols, similar solubility relationships exist and while I prefer, for reasons of economy, to employ n-butyl alcohol, it will be understood that pentanol, amyl or other higher alcohols may be employed and that the alcohols may be either normal, secondary, or tertiary.

By carrying out the extraction in counter-current fashion, a relatively large proportion of the orthophosphoric acid may be efficiently removed from the slurry.

The extracted aqueous gypsum slurry is relatively thin and is much more readily filtered than the prior art phosphoric acid containing gypsum slurry. The recovered gypsum may be employed in any of the many well-known uses for this material, for example, in gypsum cements or plasters. The filtrate is stored and subsequently returned to the digestor to recover any phosphoric acid contained therein which had not been removed by the alcohol extraction. If it is found that the impurity content of the mother liquor increases undesirably, such impurities as aluminum, iron, fluorine, and silica may be removed by adding limited amounts of finely divided calcium carbonate to the recycled mother liquor.

The extraction liquor, normal butyl alcohol, containing substantial amounts of orthophosphoric acid is next stripped of the acid by a similar counter-current liquid/liquid extraction with water as the extraction liquid. As will be evident from the preceding data, the phosphoric acid may be readily removed from the alcohol layer. The resultant aqueous orthophosphoric acid contains a small amount of alcohol and this may be removed by a further counter-current extraction with a suitable solvent for the alcohol such as benzene or other water immiscible aromatic hydrocarbons. The alcohol and the benzene may be separated by fractional distillation or as shown in the single figure, the alcohol may be stripped from the benzene by a counter-current extraction with water.

I will now describe a modification of the sulfuric acid digestion step of my process. I have found that when sufficient sulfuric acid is provided to theoretically combine with the bases present in the reactants, either free or combined with other acids than sulfuric, the extraction liquid does not contain phosphoric acid alone but rather a mixture of phosphoric acid and sulfuric acid, due to the fact that sulfuric acid is also quite soluble in normal butyl alcohol and other higher alcohols. By limiting the amount of sulfuric acid so that it is less than the amount theoretically necessary to combine with the bases present (both free and combined with other acids than sulfuric), the extraction liquid may be caused to separate a relatively pure phosphoric acid free from sulfuric acid. A slight reduction in the amount of sulfuric acid below the theoretical amount causes the extraction liquid leaving the counter-current extraction tower to contain phosphoric acid substantially free from detectable amounts of sulfuric acid.

The use of less than the theoretical amount of sulfuric acid has the disadvantage that the yields of phosphoric acid tend to be low. This may be overcome by extracting two or more slurries prepared with controlled amounts of sulfuric acid. For example, two slurries may be prepared as follows: the first slurry composition results from the addition of an amount of sulfuric acid slightly in excess of theoretical and the second slurry is produced by reacting the crude phosphate with amounts slightly less than theoretical. The slurry produced with a slight excess of sulfuric acid is extracted in counter-current fashion with normal-butyl alcohol or other higher alcohol whereby the alcohol extraction liquid contains phosphoric acid and some sulfuric acid. This extraction liquid is then passed counter-current to the slurry produced with slightly less than the theoretical amount of sulfuric acid. The sulfuric acid present in the extracting liquid reacts with the free base present in the slurry and is thereby removed from the extracting liquid, so that the organic liquid leaving the second counter-current extraction tower will contain phosphoric acid substantially free of sulfuric acid. When operating in this fashion, the extraction of phosphoric acid from the first slurry is completed before it has been completely extracted from the second slurry. The first slurry is then treated as in the overall process previously described to separate gypsum and other solids by filtration. Another batch of slurry, prepared with slightly less than the theoretical amount of sulfuric acid is extracted, the former second slurry now serves as the first slurry extracted while the newly prepared slurry serves as the second slurry extracted. By operating in this fashion, a product containing, at most, trace amounts of sulfuric acid is obtained.

The drawing diagrammatically indicates some of the possible variations of the above outlined process. Because of the relatively limited solubility of the phosphates in normal butyl alcohol and other higher alcohols, the alkali metal, alkaline earth metal, ammonium phosphates and other phosphates may be produced in a simple and direct fashion.

For example, to produce sodium phosphate, the alcohol-phosphoric acid liquid resulting from the extraction of the phosphoric acid-gypsum slurry may be treated with solid sodium hydroxide, sodium carbonate or other suitable sodium compound or with an alcohol solution of said compounds. Sodium phosphate precipitates and is recovered from the alcohol by filtration. To produce ammonium phosphate, gaseous ammonia is passed into the alcoholic extract containing phosphoric acid. The solubilities of sodium phosphate, potassium phosphate and ammonium phosphate are of the order of 0.08 gram of salt per 100 grams of n-butyl alcohol at 25° C. Thus, practically all of the phosphoric acid may be separated from the alcohol by precipitation of these salts. The solid product is separated by filtration or other suitable methods and the alcohol is returned to the cycle to extract more phosphoric acid from the slurry containing same.

The alcohol-phosphoric acid liquid may be contacted with an aqueous solution of an appropriate hydroxide or other compound. In this case, the salt of phosphoric acid which is formed dissolves in the aqueous phase and practically all of the phosphoric acid is removed from the alcohol which may be returned for further use in the extraction step. The amount of salt in the aqueous solution can be built up until it is saturated at which time the solution may be evaporated to recover the salt or the amount of hydroxide added can be sufficient to precipitate the desired salt, which may then be recovered by filtration or other suitable procedures.

Another group of products of considerable commercial interest which may be obtained are the alkyl esters of phosphoric acid. By a suitable choice of the extraction agent, it may be possible to recover such derivatives directly from the slurry.

It should be noted that little or no evaporation is required to produce the desired salts.

The above described process has been found to be very efficient and economical. Since the solubility systems involved come to equilibrium quite rapidly, a comparatively small amount of alcohol may be used to extract substantial amounts of phosphoric acid and since the alcohol is employed in a closed system, losses of the alcohol are relatively slight.

I claim:

1. A process for producing substantially pure orthophosphoric acid which comprises: producing a first aqueous slurry of gypsum and orthophosphoric acid and sulfuric acid by reacting an impure phosphate-containing material with an amount of sulfuric acid slightly in excess of the stoichiometric amount required to convert the phosphate content of the impure material to orthophosphoric acid; preparing a second aqueous slurry of gypsum and orthophosphoric acid by separately reacting an additional amount of impure phosphate-containing material with an amount of sulfuric slightly less than the stoichiometric amount required to convert the phosphate content to orthophosphoric acid, whereby a small amount of alkaline earth remains unreacted with said added acid; extracting the first slurry by a liquid/liquid counter-current extraction of the slurry with a water immiscible oxygenated hydrocarbon extraction liquid selected from liquid oxygenated hydrocarbons having at least three and not more than eight carbons in the chain carrying the oxygen group, whereby the extraction liquid removes the orthophosphoric acid and sulfuric acid from the slurry; passing the resulting liquid product containing orthophosphoric acid and sulfuric acid counter-current to the second aqueous slurry whereby the sulfuric acid reacts with unreacted alkaline earth present in the second aqueous slurry and thereby forms a solid product therewith, separating the solid from the remaining liquid product; and recovering the orthophosphoric acid values from the separated liquid product.

2. The process of claim 1 in which the oxygenated hydrocarbon is an alcohol having at least three and not more than eight carbon atoms in the chain carrying the oxygen group.

3. The process of claim 2 in which the alcohol is a butyl alcohol.

4. The process of claim 1 in which a third aqueous slurry is prepared by reacting additional impure phosphate-containing material with an amount of sulfuric acid slightly less than the stochiometric amount required to convert the phosphate content of the impure starting material to orthophosphoric acid and the process is continued by passing the previously prepared second slurry after it has been passed counter-current to the liquid product, counter-current to additional liquid product and thereafter passing the extract obtained counter-current to the third slurry so as to remove any sulfuric acid from the extract; recovering the phosphoric acid from the neutralized liquid and repeating the process by preparing additional slurries deficient in sulfuric acid and passing such slurries counter-current to the extraction liquid produced by extraction of slurries which have a slight excess of sulfuric acid.

References Cited in the file of this patent

UNITED STATES PATENTS

| | | |
|---|---|---|
| 1,838,431 | Milligan | Dec. 29, 1931 |
| 1,857,470 | Milligan | May 10, 1932 |
| 1,929,441 | Milligan | Oct. 10, 1933 |
| 1,929,442 | Milligan | Oct. 10, 1933 |
| 1,968,544 | Vana | July 31, 1934 |